(12) United States Patent
Tominaga et al.

(10) Patent No.: US 8,139,557 B2
(45) Date of Patent: Mar. 20, 2012

(54) WIRELESS BASE STATION APPARATUS AND SYSTEM TO AVOID PREAMBLE INTERFERENCE

(75) Inventors: Tsuyoshi Tominaga, Tokyo (JP); Kunio Satou, Tokyo (JP); Yasuhiro Ohnaka, Tokyo (JP); Takeshi Fukunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 887 days.

(21) Appl. No.: 12/066,083

(22) PCT Filed: Sep. 30, 2005

(86) PCT No.: PCT/JP2005/018094
§ 371 (c)(1),
(2), (4) Date: Mar. 7, 2008

(87) PCT Pub. No.: WO2007/043096
PCT Pub. Date: Apr. 19, 2007

(65) Prior Publication Data
US 2008/0253355 A1    Oct. 16, 2008

(51) Int. Cl.
*H04J 3/06* (2006.01)
(52) U.S. Cl. .............. 370/350; 370/395.63; 370/395.62; 370/503; 370/512; 455/502; 455/515; 455/522; 455/113
(58) Field of Classification Search .................. 709/350, 709/395.62, 395.63, 503, 509, 512; 455/502, 455/515, 522, 113, 139; 370/350, 395.62, 370/395.63, 503, 509, 512
See application file for complete search history.

(56) References Cited

U.S. PATENT DOCUMENTS

| | | | |
|---|---|---|---|
| 5,825,758 A | 10/1998 | Heikkinen et al. | |
| 6,298,095 B1 | 10/2001 | Kronestedt et al. | |
| 7,050,823 B1* | 5/2006 | Salonaho | 455/522 |
| 7,633,997 B2* | 12/2009 | Lattard et al. | 375/219 |
| 2002/0034158 A1* | 3/2002 | Wang et al. | 370/203 |
| 2005/0002323 A1* | 1/2005 | Hadad | 370/203 |
| 2005/0101330 A1 | 5/2005 | Chang et al. | |
| 2006/0234715 A1* | 10/2006 | Cho et al. | 455/447 |

(Continued)

FOREIGN PATENT DOCUMENTS

CN  1617467 A  5/2005
(Continued)

OTHER PUBLICATIONS

"IEEE Computer Society and the IEEE Microwave Theory and Techniques Society", IEEE Standards for Local and Metropolitan Area Networks, Part 16, pp. 502 to 503 and pp. 814 to 815, 2004.

(Continued)

*Primary Examiner* — Jeffrey Pwu
*Assistant Examiner* — Abdelnabi Musa
(74) *Attorney, Agent, or Firm* — Oblon, Spivak, McClelland, Maier & Neustadt, L.L.P.

(57) ABSTRACT

A radio base-station apparatus with improved frame transmission efficiency by avoiding interference of preambles and frame control information between sectors of a cell or between cells with a frequency reuse factor. In the apparatus OFDMA multiple-access processing is performed for each of a plurality of sectors of a cell, and frames made of logical subchannel numbers and OFDMA symbol numbers are configured in synchronization respectively for the plurality of sectors, and offsets are added to the beginnings of given frames such that the preambles and frame control information arranged sequentially from the beginnings of the frames do not overlap on the OFDMA symbol numbers.

12 Claims, 15 Drawing Sheets

U.S. PATENT DOCUMENTS

2008/0039129 A1* 2/2008 Li et al. .................. 455/522

FOREIGN PATENT DOCUMENTS

| EP | 1 530 391 A1 | 5/2005 |
|---|---|---|
| JP | 9-501038 | 1/1997 |
| JP | 2001 218255 | 8/2001 |
| JP | 2002-510934 | 4/2002 |
| JP | 2005 143080 | 6/2005 |
| JP | 2005 223772 | 8/2005 |
| WO | WO 2005/043791 A2 | 5/2005 |
| WO | WO 2005/043854 A1 | 5/2005 |
| WO | WO 2005/086381 A1 | 9/2005 |

OTHER PUBLICATIONS

Extended European Search Report issued Jul. 7, 2011, in European Patent Application No. 05787696.3.

* cited by examiner

F I G . 2
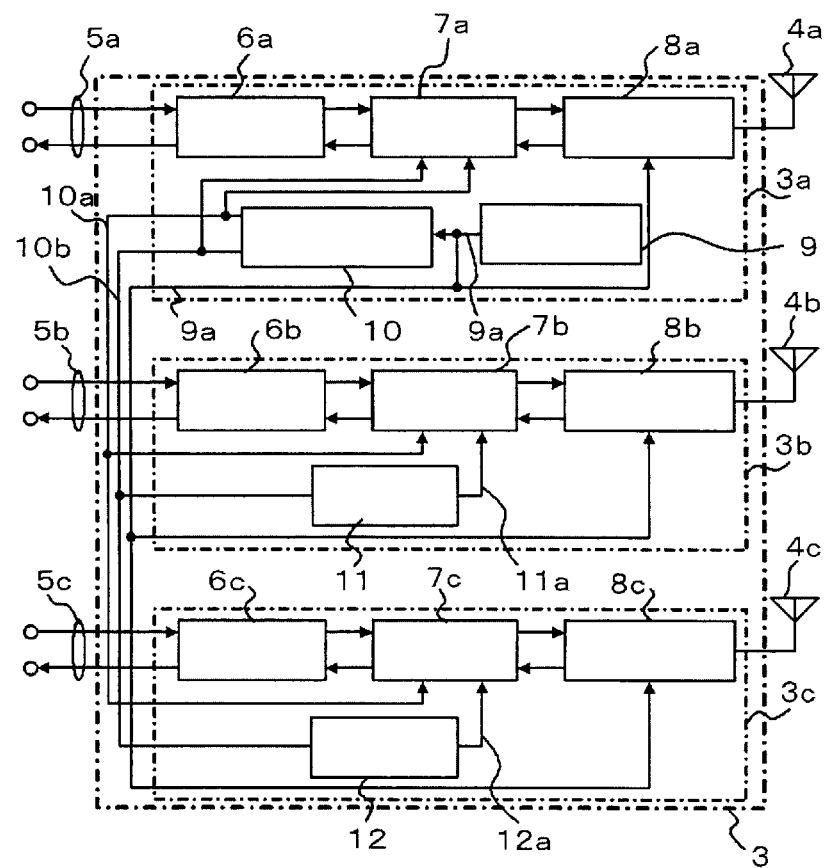

F I G. 7
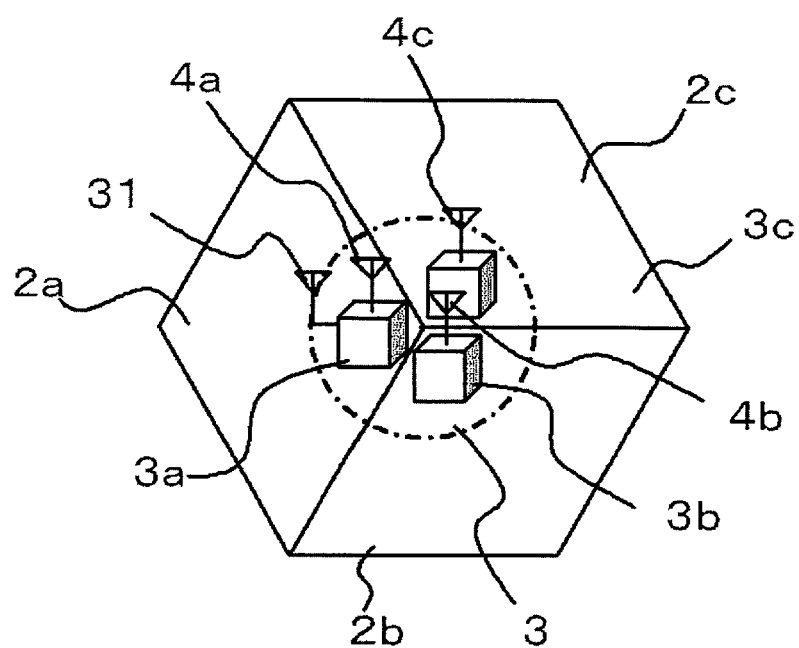

WIRELESS BASE STATION APPARATUS AND SYSTEM TO AVOID PREAMBLE INTERFERENCE

TECHNICAL FIELD

The present invention relates to a radio base-station apparatus using an OFDMA system, and particularly to a radio base-station apparatus that is capable of avoiding interference between sectors when a plurality of sectors in a cell are used with frequency reuse factor 1.

BACKGROUND ART

IEEE 802.16 was established as a standard for radio MAN (Metropolitan Area Network), initially for FWA (Fixed Wireless Access) use, and it originally supports techniques for realizing high-efficiency radio transmission through high-level optimization of base stations, such as QoS (Quality of Service), AAS (Adaptive Antenna System), transmission diversity, etc.

Recently, schemes with excellent frequency-selective fading tolerance have been added thereto, such as OFDM (Orthogonal Frequency Division Multiplexing) and OFDMA (Orthogonal Frequency Division Multiple Access), and it now deals with radio access communications in multipath environments unanticipatedly.

With this situation, in mobile communications, expansions are now in progress mainly with OFDMA that offers sub-channelization of individual terminal stations and is capable of handling propagation environments varying independently among the terminal stations.

Now, a conventional OFDMA technique will be described. FIGS. 13 to 15 show a technique described in the IEEE 802.16 (IEEE P802.16-REVd/D5-2004, downloaded on 2004.11.8), for example, where FIG. 13 illustrates a sector configuration in which one cell is divided into three sectors, FIG. 14 illustrates the configuration of a radio base-station apparatus divided into segments corresponding to individual sectors, and FIG. 15 illustrates the OFDMA frame structure.

In FIG. 13, a cell 100 is divided into three sectors 101a, 101b and 101c. The cell 100 has a radio base-station apparatus 103 having antennas 102a, 102b and 102c for sending and receiving radio signals to and from terminal stations (not shown) located in the areas of the sectors 101a, 101b and 101c.

In FIG. 14, the radio base-station apparatus 103 includes PHY (physical layer) processing blocks 104a, 104b and 104c for performing OFDMA modulation/demodulation and frame formation respectively for the sectors 101a, 101b and 101c, radio transmitter/receiver blocks 105a, 105b and 105c for sending and receiving radio signals through the antennas 102a, 102b and 102c to and from terminal stations not shown, a MAC (Media Access Control) processing block 106 for performing data allocation to the individual segments corresponding to the sectors 101a, 101b and 101c, and a network I/F 107 connected to the MAC processing block 106 through a network or the like not shown.

In FIG. 15, the vertical axis shows the entire band of radio frequencies used with logical subchannel numbers 110, and the horizontal axis shows time with OFDMA symbol numbers 111. The logical subchannel numbers 110 are divided into three segments in correspondence with the sectors 101a, 101b and 101c. The logical subchannel numbers 110 and OFDMA symbol numbers 111 thus form frames 112a, 112b and 112c for individual sectors 101a, 101b and 101c, which respectively include, sequentially from the beginning, pre-ambles 113a, 113b and 113c, broadcast information 114a, 114b and 114c, downlink allocation information 115a, 115b and 115c, uplink allocation information 116a, 116b and 116c, downlink data regions 117a, 117b and 117c, and uplink data regions 118a, 118b and 118c. The broadcast information 114a, 114b and 114c, downlink allocation information 115a, 115b and 115c, and uplink allocation information 116a, 116b and 116c form frame control information.

Next, its operation will be described referring to FIGS. 13 to 15.

The MAC processing block 106 performs segmentation processing by dividing the entire radio frequency band for the logical subchannel numbers 110 into three segments corresponding to the sectors 101a, 101b and 101c, and allocating data to the individual segments.

Next, with the three segments corresponding to the sectors 101a, 101b and 101c, the PHY processing blocks 104a, 104b and 104c respectively generate the frames 112a, 112b and 112c and perform OFDMA modulation/demodulation processing, with the frames 112a, 112b and 112c respectively including, sequentially from the beginning, the preambles 113a, 113b and 113c, the broadcast information 114a, 114b and 114c, the downlink allocation information 115a, 115b and 115c, the uplink allocation information 116a, 116b and 116c, the downlink data regions 117a, 117b and 117c, and the uplink data regions 118a, 118b and 118c.

Then, the radio transmitter/receiver blocks 105a, 105b and 105c perform frequency conversion and amplification processing to enable radio-signal transmission/reception with terminal stations, and radio signals are transmitted to and received from terminal stations through the antennas 102a, 102b and 102c.

Non-Patent Document 1: IEEE P802.16-REVd/D5-2004, downloaded on 2004.11.8.

DISCLOSURE OF THE INVENTION

Problems to be Solved by the Invention

With the conventional radio base-station apparatus described above, the entire band of radio frequencies used is divided into three segments corresponding to the sectors 101a, 101b and 101c, and therefore the maximum radio-signal transmission rate is reduced to ⅓ or below as compared with frequency reuse factor 1 in which the entire band of same radio frequencies is allocated to each of the sectors 101a, 101b and 101c, for example.

In order to avoid the reduction of maximum transmission rate, when the subchannelization function of OFDMA is used with the frequency reuse factor 1 in which the same entire radio frequency band is allocated to each of the sectors 101a, 101b and 101c, then interference occurs between the preambles 113a, 113b and 113c, broadcast information 114a, 114b and 114c, downlink allocation information 115a, 115b and 115c, and uplink allocation information 116a, 116b and 116c, resulting in reduced transmission efficiency.

The same problem occurs also when the frequency reuse factor 1, which allocates the entire same radio frequency band, is applied to another cell adjacent to the cell 100, for example.

The present invention has been made to solve the above-described problems, and an object of the present invention is to provide a radio base-station apparatus configured to work with frequency reuse factor 1 to avoid reduction of maximum transmission rate, and to achieve improved frame transmission efficiency by avoiding interference of preambles and frame control information, including broadcast information, downlink allocation information and uplink allocation information, between sectors in a cell and between adjacent cells when frequency reuse factor 1 is adopted.

Means for Solving the Problems

According to the present invention, a radio base-station apparatus is configured to work with a frequency reuse factor 1 where a plurality of sectors of a cell are used with a same radio frequency, and the radio base-station apparatus performs OFDMA multiple-access processing for each of the plurality of sectors, and configures frames respectively for the plurality of sectors with logical subchannel numbers and OFDMA symbol numbers such that preambles and pieces of frame control information arranged sequentially from the beginnings of the frames do not interfere with each other between the frames formed respectively for the plurality of sectors.

EFFECTS OF THE INVENTION

According to the radio communications base-station apparatus of the present invention, the frames respectively for the plurality of sectors are configured such that preambles and frame control information pieces arranged sequentially from the beginnings of the frames do not interfere with each other between the frames respectively corresponding to the plurality of sectors, and thus no interference occurs among the preambles and frame control information pieces arranged in the individual frames, and the frame transmission efficiency is improved.

BRIEF DESCRIPTION OF THE DRAWINGS

[FIG. 2] A diagram illustrating a radio communications base-station apparatus of the first preferred embodiment of the present invention.
[FIG. 7] A diagram illustrating a sector configuration of the fourth preferred embodiment of the present invention.

DESCRIPTION OF REFERENCE CHARACTERS

1 Cell; 2a, 2b, 2c Sectors; 3, 3a, 3b, 3c Radio base-station apparatus (devices);
4a, 4b, 4c Antennas; 5a, 5b, 5c Network I/F;
6a, 6b, 6c MAC processing blocks; 7a, 7b, 7c PHY processing blocks;
8a, 8b, 8c Radio transmitter/receiver blocks; 9 Reference clock source; 9a Reference clock signal;
10 System clock generator; 10a System clock signal;
10b Frame start signal; 11, 12 Delay adders;
11a, 12a Frame start signals;
13a, 13b, 13c Logical subchannel numbers;
14 OFDMA symbol numbers; 15a, 15b, 15c Frames;
16a, 16b, 16c Preambles; 17a, 17b, 17c Broadcast information;
18a, 18b, 18c Downlink allocation information;
19a, 19b, 19c Uplink allocation information;
20a, 20b, 20c Downlink data regions;
21a, 21b, 21c Uplink data regions; and
22a, 22b NULL subcarrier regions.

BEST MODE FOR CARRYING OUT THE INVENTION

Now, in order to more fully describe the present invention, the best mode for carrying out the invention will be described referring to the accompanying drawings.

First Preferred Embodiment

A radio base-station apparatus according to a first preferred embodiment of the present invention will be described referring to FIGS. 1 to 3.

Figure 1:
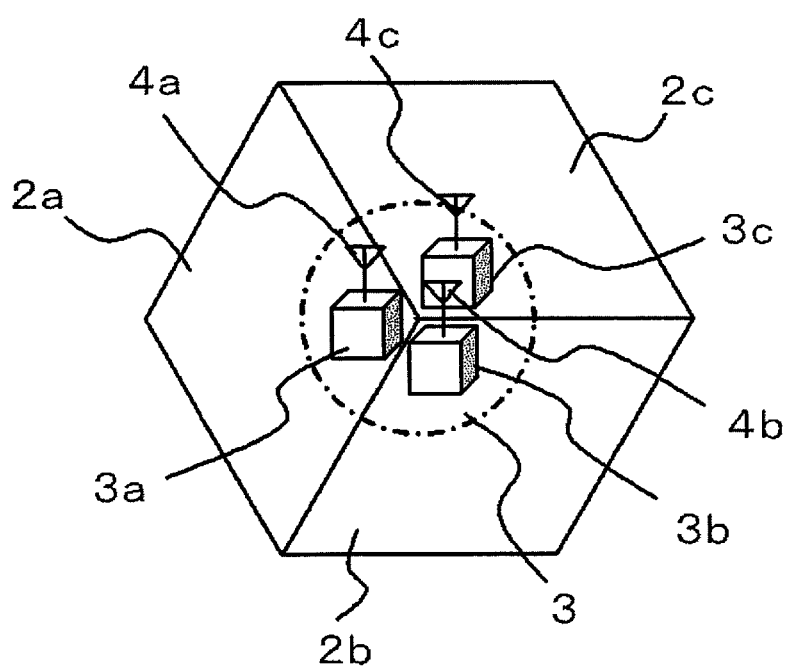
[FIG. 1] A diagram illustrating a sector configuration according to a first preferred embodiment of the present invention.

FIG. 1 is a diagram illustrating a sector configuration in which one cell as a communication area of one radio base-station apparatus is divided into three sectors.

In FIG. 1, a cell 1 is divided into three sectors 2a, 2b and 2c, and the entire band of the same radio frequencies is allocated to each (so-called frequency reuse factor 1). The cell 1 has a radio base-station apparatus 3. The radio base-station apparatus 3 includes radio base-station devices 3a, 3b and 3c respectively corresponding to the sectors 2a, 2b and 2c. The radio base-station devices 3a, 3b and 3c respectively have antennas 4a, 4b and 4c for transmitting and receiving radio signals to and from terminal stations (not shown) located in the areas of the sectors 2a, 2b and 2c.

FIG. 2 is a diagram illustrating the configuration of the radio base-station apparatus.

In FIG. 2, the radio base-station device 3a works as a master for the radio base-station devices 3b and 3c. The radio base-station device 3a includes a network I/F 5a connected to a network not shown, a MAC processing block 6a for performing data allocation for the sector 2a, a PHY processing block 7a for performing frame formation and OFDMA modulation/demodulation processing for the sector 2a, a radio transmitter/receiver block 8a for transmitting and receiving radio signals through the antenna 4a to and from terminal stations (not shown) located in the area of the sector 2a, a reference clock source 9 for outputting a reference clock signal 9a, and a system clock generator 10 for applying frequency conversion etc. to the reference clock signal 9a to generate and output a given system clock signal 10a and frame start signal 10b.

The radio base-station device 3b works as a slave for the radio base-station device 3a as a master. The radio base-station device 3b includes a network I/F 5b connected to the network not shown, a MAC processing block 6b for performing data allocation for the sector 2b, a PHY processing block 7b for performing frame formation and OFDMA modulation/demodulation processing for the sector 2b, a radio transmitter/receiver block 8b for transmitting and receiving radio signals through the antenna 4b to and from terminal stations (not shown) located in the area of the sector 2b, and a delay adder 11 for adding a given offset, for the sector 2b, to the frame start signal 10b to output a frame start signal 11a.

The radio base-station device 3c works as a slave for the radio base-station device 3a as a master. The radio base-station device 3c includes a network I/F 5c connected to the network not shown, a MAC processing block 6c for performing data allocation for the sector 2c, a PHY processing block 7c for performing frame formation and OFDMA modulation/demodulation processing for the sector 2c, a radio transmitter/receiver block 8c for transmitting and receiving radio signals through the antenna 4c to and from terminal stations (not shown) located in the area of the sector 2c, and a delay adder 12 for adding a given offset, for the sector 2c, to the frame start signal 10b to output a frame start signal 12a.

Figure 3:
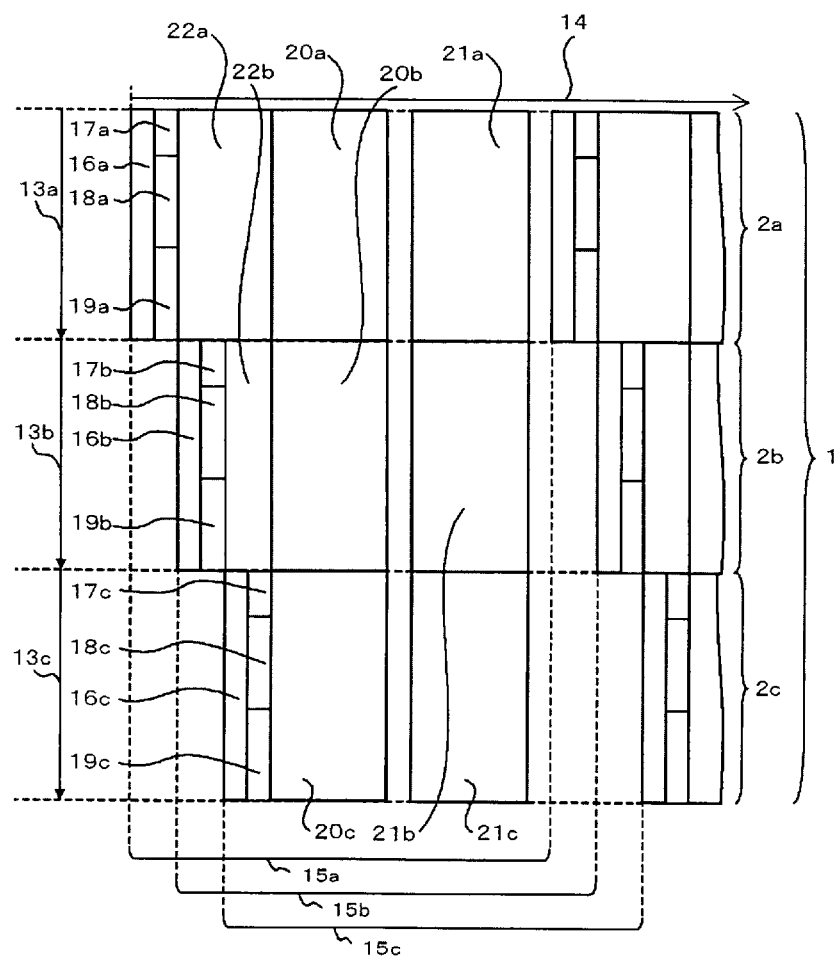
[FIG. 3] A diagram illustrating the frame structure of the first preferred embodiment of the present invention.

FIG. 3 is a diagram illustrating the OFDMA frame structure.

In FIG. 3, the vertical axis shows frequency, which is represented as logical subchannel numbers 13a, 13b and 13c where the entire band of same radio frequencies is allocated to each of the three sectors 2a, 2b and 2c. This configures a frequency reuse factor 1 in which the entire same radio frequency band is allocated to each of the sectors 2a, 2b and 2c. The horizontal axis shows time, which is represented as OFDMA symbol numbers 14.

Thus, the logical subchannel numbers 13a, 13b, and 13c corresponding to the sectors 2a, 2b and 2c and the OFDMA symbol numbers 14 configure frames 15a, 15b and 15c as units for transmission and reception of radio signals.

The frames 15a, 15b and 15c respectively include preambles 16a, 16b and 16c, broadcast information 17a, 17b and 17c, downlink allocation information 18a, 18b and 18c, uplink allocation information 19a, 19b and 19c, downlink data regions 20a, 20b and 20c, and uplink data regions 21a, 21b and 21c, which are sequentially arranged from the beginning of each frame. The broadcast information 17a, 17b and 17c, downlink allocation information 18a, 18b and 18c, and uplink allocation information 19a, 19b and 19c form frame control information.

In the frames 15a and 15b, NULL subcarrier regions 22a and 22b with no output of subcarriers, including pilot subcarriers, immediately precede the downlink data regions 20a and 20b, respectively.

Next, its operation will be described referring to FIGS. 1 to 3.

First, the reference clock source 9 of the radio base-station device 3a for the sector 2a outputs a reference clock 9a.

By using the reference clock 9a, the radio transmitter/receiver blocks 8a, 8b and 8c synchronize the carriers for transmission and reception by the radio base-station devices 3a, 3b and 3c.

Also, the reference clock 9a is inputted to the system clock generator 10, and the system clock generator 10 applies frequency conversion etc. to it so as to generate and output a given system clock signal 10a and frame start signal 10b as reference.

Then, by using the system clock signal 10a and referring to the frame start signal 10b, the PHY processing block 7a of the radio base-station device 3a for the sector 2a forms the frame 15a, as shown in FIG. 3, sequentially including the preamble 16a, broadcast information 17a, downlink allocation information 18a, uplink allocation information 19a, NULL subcarrier region 22a, downlink data region 20a, and uplink data region 21a.

In the radio base-station device 3b for the sector 2b, the delay adder 11 adds a given amount of delay to the frame start signal 10b to generate a frame start signal 11a so that the beginning of the frame 15b will not overlap on the OFDMA symbol numbers 14 with the preamble 16a of the frame 15a, its broadcast information 17a, downlink allocation information 18a, and uplink allocation information 19a. Then, by using the system clock signal 10a and referring to the frame start signal 11a, the PHY processing block 7b of the radio base-station device 3b forms the frame 15b, as shown in FIG. 3, sequentially including the preamble 16b, broadcast information 17b, downlink allocation information 18b, uplink allocation information 19b, NULL subcarrier region 22b, downlink data region 20b, and uplink data region 21b.

In the radio base-station device 3c for the sector 2c, the delay adder 12 adds a given amount of delay to the frame start signal 10b to generate a frame start signal 12a so that the beginning of the frame 15c will not overlap on the OFDMA symbol numbers 14 with the preamble 16a of the frame 15a, its broadcast information 17a, downlink allocation information 18a, and uplink allocation information 19a, and with the preamble 16b of the frame 15b, its broadcast information 17b, downlink allocation information 18b, and uplink allocation information 19b. Then, by using the system clock signal 10a and referring to the frame start signal 12a, the PHY processing block 7c of the radio base-station device 3c forms the frame 15c, as shown in FIG. 3, sequentially including the preamble 16c, broadcast information 17c, downlink allocation information 18c, uplink allocation information 19c, downlink data region 20c, and uplink data region 21c.

By configuring the frames 15a, 15b and 15c in this way, no overlap occurs on the OFDMA symbol numbers 14 between the preambles 16a, 16b and 16c of the respective frames 15a, 15b and 15c, their respective broadcast information 17a, 17b and 17c, downlink allocation information 18a, 18b and 18c, and uplink allocation information 19a, 19b and 19c. Thus, when the radio base-station devices 3a, 3b and 3c transmit/receive radio signals to/from terminal stations, interference does not occur between the preambles 16a, 16b and 16c, broadcast information 17a, 17b and 17c, downlink allocation information 18a, 18b and 18c, and uplink allocation information 19a, 19b and 19c, which provides improved frame transmission efficiency.

Then, by using the timings of the frames 15a, 15b and 15c, radio signals are transmitted and received to and from the terminal stations located in the sectors 2a, 2b and 2c, through the radio transmitter/receiver blocks 8a, 8b and 8c and the antennas 4a, 4b and 4c of the radio base-station devices 3a, 3b and 3c corresponding to the sectors 2a, 2b and 2c.

Second Preferred Embodiment

Figure 4:
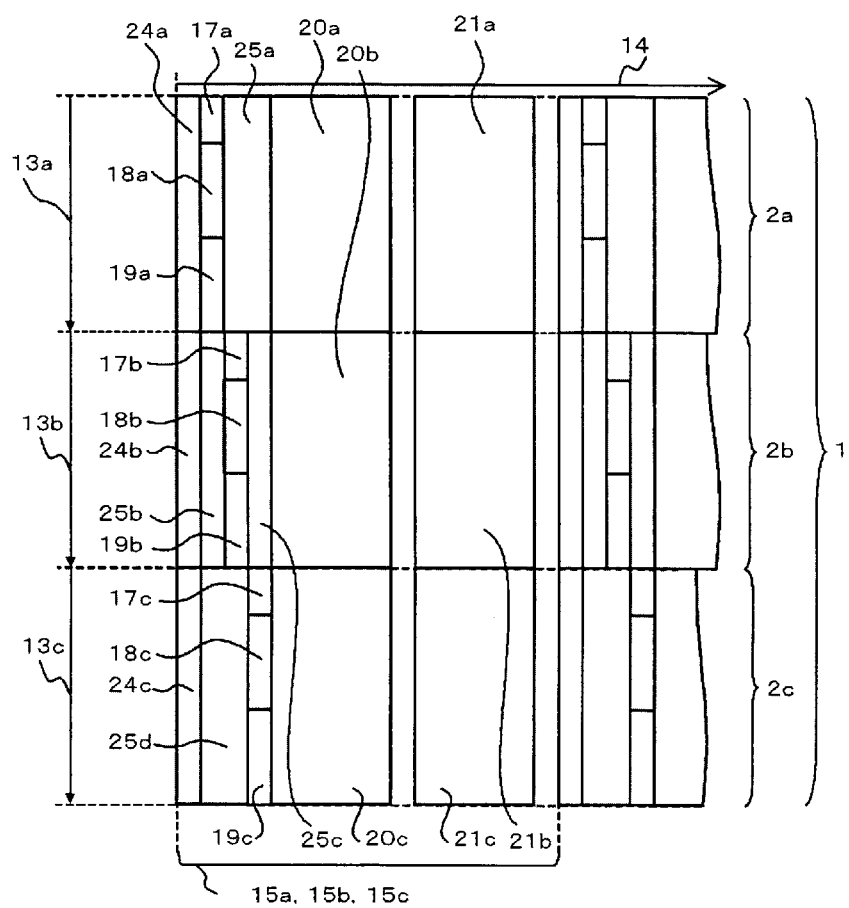
[FIG. 4] A diagram illustrating the frame structure according to a second preferred embodiment of the present invention.

In the first preferred embodiment, the preambles 16a, 16b and 16c of the frames 15a, 15b and 15c corresponding to the sectors 2a, 2b and 2c do not overlap each other on the OFDMA symbol numbers 14; however, as shown with the OFDMA frame structure illustrated in FIG. 4, the preambles of the frames 15a, 15b and 15c may be made of different patterns of preambles 24a, 24b and 24c that have no correlation with each other, i.e. that can be detected even when interference occurs between preambles, and then they may coincide with each other on the OFDMA symbol numbers 14. The reference characters 25a, 25b, 25c and 25d indicate NULL subcarrier regions. In this case, the delay adders 11 and 12 add no offsets. In FIG. 4, the same reference characters as those shown in the first preferred embodiment indicate the same or corresponding components, and so they are not described again here.

In this way, the preambles 24a, 24b and 24c having different patterns with no correlation with each other overlap each other on the OFDMA symbol numbers 14, and thus the overhead is reduced for the time of the overlap of preambles 24a 24b and 24c, and the frame transmission efficiency is further improved than in the first preferred embodiment.

Third Preferred Embodiment

Figure 5:
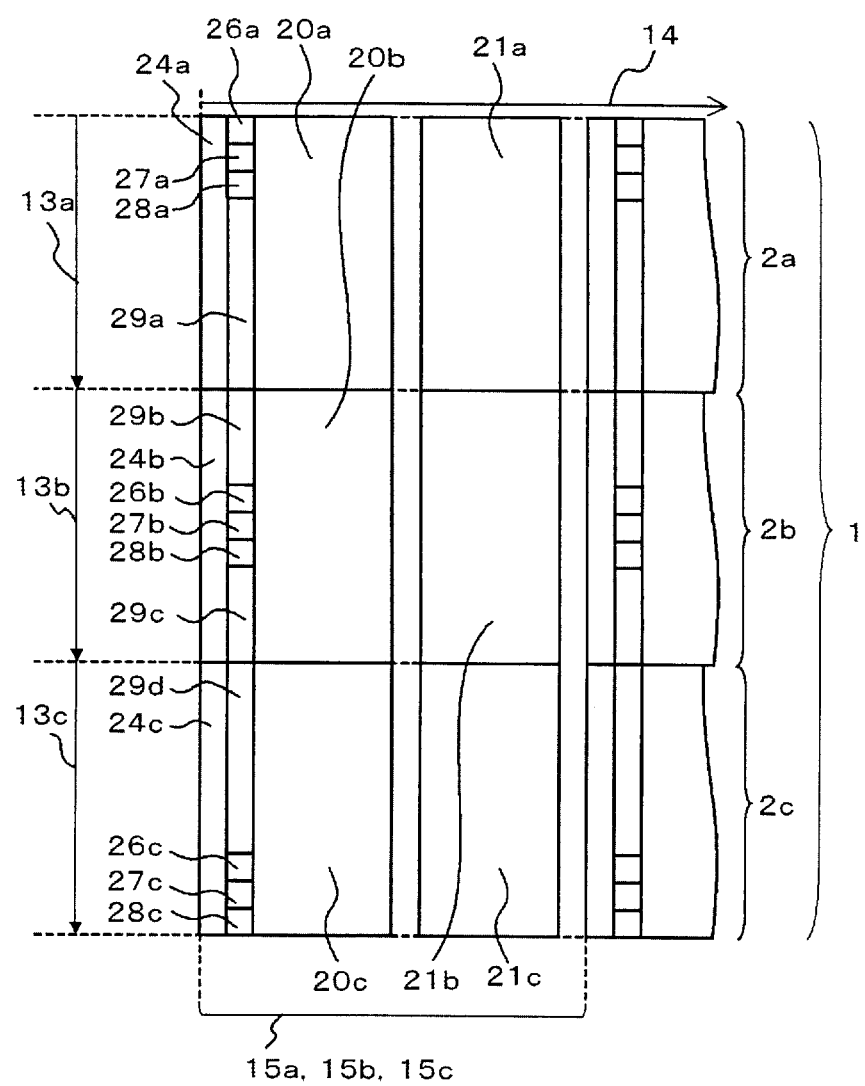
[FIG. 5] A diagram illustrating the frame structure according to a third preferred embodiment of the present invention.

In the second preferred embodiment, the preambles 24a, 24b and 24c of the frames 15a, 15b and 15c corresponding to the sectors 2a, 2b and 2c overlap each other on the OFDMA symbol numbers 14; however, as shown with the OFDMA frame structure illustrated in FIG. 5, the frame control information, or the broadcast information 26a, 26b and 26c, downlink allocation information 27a, 27b and 27c, and uplink allocation information 28a, 28b and 28c, may be arranged such that they do not overlap on the logical subchannel numbers 13a, 13b and 13c. The reference characters 29a, 29b, 29c and 29d indicate NULL subcarrier regions. In this case, the delay adders 11 and 12 add no offsets. In FIG. 5, the same reference characters as those shown in the first and second preferred embodiments indicate the same or corresponding components and so they are not described again here.

In this way, the frame control information, or the broadcast information 26a, 26b and 26c, downlink allocation information 27a, 27b and 27c, and uplink allocation information 28a, 28b and 28c, can overlap on the OFDMA symbol numbers 14, and thus the overhead is reduced for the time of the overlap of broadcast information 26a, 26b and 26c, downlink allocation information 27a, 27b and 27c, and uplink allocation information 28a, 28b and 28c, and the frame transmission efficiency is further improved than in the second preferred embodiment.

Fourth Preferred Embodiment

Figure 6:
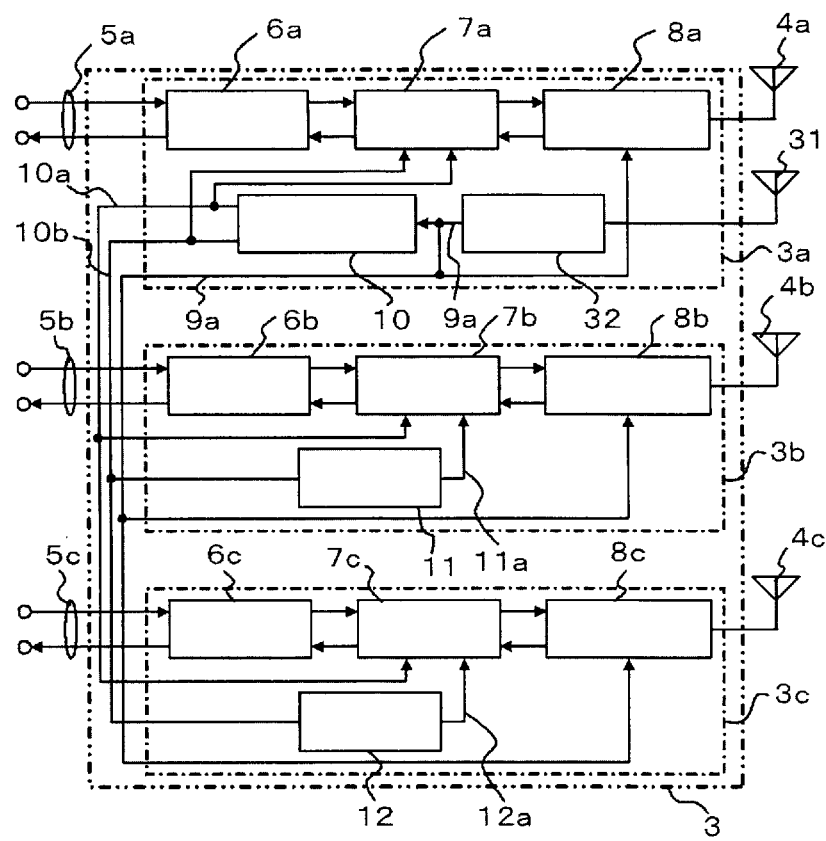
[FIG. 6] A diagram illustrating a radio communications base-station apparatus according to a fourth preferred embodiment of the present invention.

In the first to third preferred embodiments, as shown in FIG. 2, the radio base-station device 3a includes the reference clock source 9 that outputs the reference clock signal 9a, but, as shown by the configuration of a radio base-station apparatus illustrated in FIG. 6 and the sector configuration illustrated in FIG. 7, the reference clock source 9 may be replaced by a GPS receiver 32 that extracts a reference clock signal 9a from a GPS signal received through an antenna 31 from a GPS satellite not shown. In FIGS. 6 and 7, the same reference characters as those used in the first to third preferred embodiments indicate the same or corresponding components and so they are not described again here.

With this configuration, the GPS receiver 32 extracts the reference clock signal 9a from the GPS signal received through the antenna 31 from a GPS satellite not shown. In other respects, the operation is the same as those of the first to third preferred embodiments.

The first to fourth preferred embodiments have shown a configuration in which one cell is divided into three sectors, but this configuration is only illustrative and not restrictive, and not intended to particularly limit the number of sectors.

Fifth Preferred Embodiment

In the fourth preferred embodiment, the reference clock signal is extracted from a GPS signal received from a GPS satellite not shown, and then, in a radio communications system having a plurality of cells, it is easy to synchronize operations as described in the first to third preferred embodiments among the plurality of cells.

Figure 8:
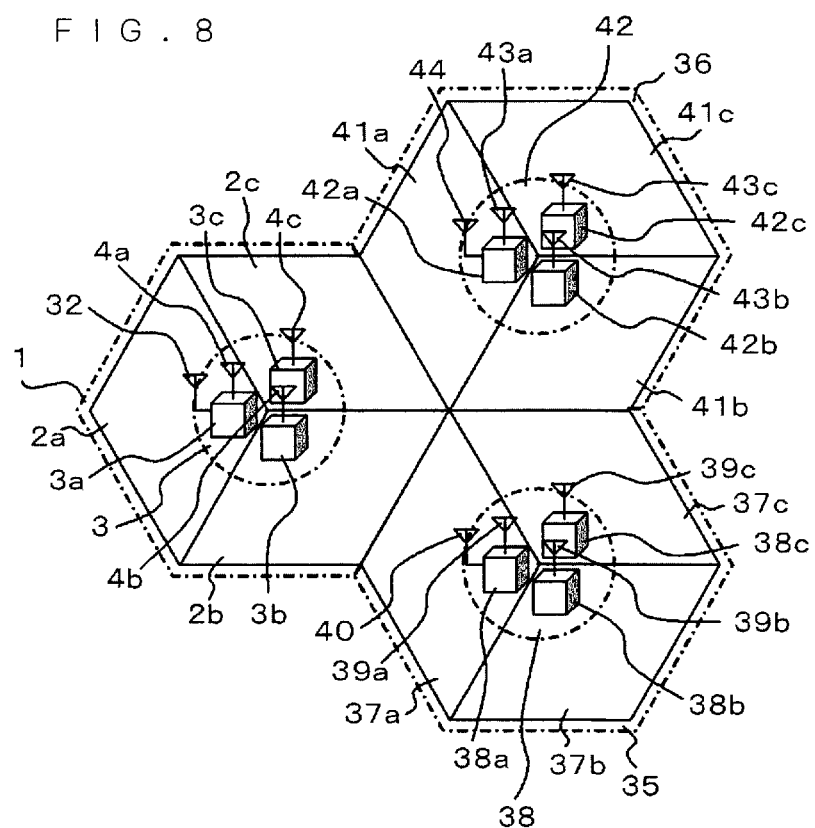
[FIG. 8] A diagram illustrating a cell configuration according to a fifth preferred embodiment of the present invention.
Figure 9:
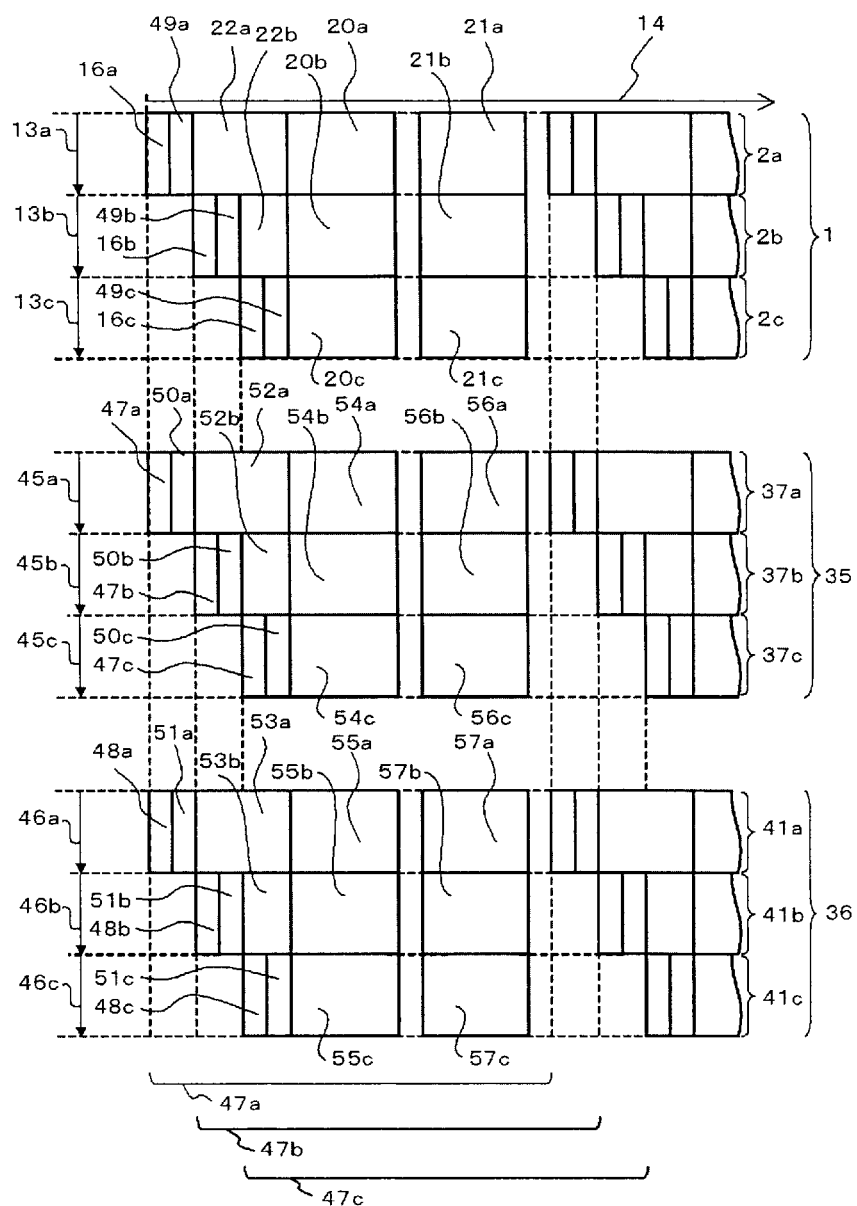
[FIG. 9] A diagram illustrating the frame structure of the fifth preferred embodiment of the present invention.

FIGS. 8 and 9 illustrate a radio communications system having a plurality of cells according to a fifth preferred embodiment of the present invention.

FIG. 8 illustrates a sector configuration that has three cells each configured as shown in the fourth preferred embodiment, and each cell is divided into three sectors.

FIG. 9 is a diagram illustrating the OFDMA frame structure for the individual sectors shown in FIG. 8. In FIGS. 8 and 9, the same reference characters as those used in the first to fourth preferred embodiments indicate the same or corresponding components, and so they are not described gain here.

In FIG. 8, the cell 1 corresponds to that shown in FIG. 7 of the fourth preferred embodiment. Cells 35 and 36 are provided adjacent to the cell 1.

Like the cell 1, the cell 35 is divided into three sectors 37a, 37b and 37c, and each is assigned the same entire radio frequency band as that assigned to the sectors 2a, 2b and 2c of the cell 1 (so-called frequency reuse factor 1). The cell 35 has a radio base-station apparatus 38. The radio base-station apparatus 38 includes radio base-station devices 38a, 38b and 38c respectively corresponding to the sectors 37a, 37b and 37c. The radio base-station devices 38a, 38b and 38c respectively have antennas 39a, 39b and 39c for transmitting and receiving radio signals to and from terminal stations (not shown) located in the areas of the sectors 37a, 37b and 37c. The radio base-station device 38a serving as a master has an antenna 40 for receiving a GPS signal from a GPS satellite not shown. The radio base-station devices 38a, 38b and 38c are configured in correspondence respectively with the radio base-station devices 3a, 3b and 3c shown in FIG. 6 in the fourth preferred embodiment.

Also, like the cell 1, the cell 36 is divided into three sectors 41a, 41b and 41c, and each is assigned the same entire radio frequency band as that assigned to the sectors 2a, 2b and 2c of the cell 1 (so-called frequency reuse factor 1). The cell 36 has a radio base-station apparatus 42. The radio base-station apparatus 42 includes radio base-station devices 42a, 42b and 42c respectively corresponding to the sectors 41a, 41b and 41c. The radio base-station devices 42a, 42b and 42c respectively have antennas 43a, 43b and 43c for transmitting and receiving radio signals to and from terminal stations (not shown) located in the areas of the sectors 41a, 41b and 41c. The radio base-station device 42a serving as a master has an antenna 44 for receiving a GPS signal from a GPS satellite not shown. The radio base-station devices 42a, 42b and 42c are configured in correspondence respectively with the radio base-station devices 3a, 3b and 3c shown in FIG. 6 in the fourth preferred embodiment.

In FIG. 9, the vertical axis shows frequency, and the entire band of same radio frequencies is allocated to each of the three sectors 2a, 2b, 2c of the cell 1, the three sectors 37a, 37b and 37c of the cell 35, and the three sectors 41a, 41b and 41c of the cell 36. This allocation is represented with logical subchannel numbers 13a, 13b and 13c for the sectors 2a, 2b and 2c, logical subchannel numbers 45a, 45b and 45c for the sectors 37a, 37b and 37c, and logical subchannel numbers 46a, 46b and 46c for the sectors 41a, 41b and 41c. This configures a frequency reuse factor 1 in which the entire same radio frequency band is allocated to each of the sectors 2a, 2b, 2c, 37a, 37b, 37c, 41a, 41b and 41c. The horizontal axis shows time, represented as OFDMA symbol numbers 14.

Thus, the logical subchannel numbers 13a, 13b, 13c, 45a, 45b, 45c, 46a, 46b and 46c for the sectors 2a, 2b, 2c, 37a, 37b, 37c, 41a, 41b and 41c and the OFDMA symbol numbers 14 form frames 47a, 47b and 47c as units for transmission and reception of radio signals. In this case, the frame 47a corresponds to the sectors 2a, 37a and 41a, the frame 47b corresponds to the sectors 2b, 37b and 41b, and the frame 47c corresponds to the sectors 2c, 37c and 41c.

The frame 47a corresponds to the sectors 2a, 37a and 41a of the cells 1, 35 and 36, which includes, sequentially from the beginning, preambles 16a, 47a and 48a, frame control information 49a, 50a and 51a, NULL subcarrier regions 22a, 52a and 53a, downlink data regions 20a, 54a and 55a, and uplink data regions 21a, 56a and 57a.

The frame 47b corresponds to the sectors 2b, 37b and 41b of the cells 1, 35 and 36, which includes, sequentially from the beginning, preambles 16b, 47b and 48b, frame control information 49b, 50b and 51b, NULL subcarrier regions 22b, 52b and 53b, downlink data regions 20b, 54b and 55b, and uplink data regions 21b, 56b and 57b.

The frame 47c corresponds to the sectors 2c, 37c and 41c of the cells 1, 35 and 36, which includes, sequentially from the beginning, preambles 16c, 47c and 48c, frame control information 49c, 50c and 51c, downlink data regions 20c, 54c and 55c, and uplink data regions 21c, 56c and 57c.

The frame control information includes broadcast information, downlink allocation information, and uplink allocation information. For example, the frame control information 49a includes the broadcast information 17a, the downlink allocation information 18a, and the uplink allocation information 19a shown in FIG. 3.

Next, its operation will be described referring to FIGS. 6, 8 and 9.

The operations of the frames 47a, 47b and 47c that correspond to the sectors 2a, 2b and 2c of the cell 1 are the same as those described in the first and fourth preferred embodiments. The frames 47a, 47b and 47c provided for the sectors 2a, 2b and 2c correspond to the frames 15a, 15b and 15c described in the first and fourth preferred embodiments.

This preferred embodiment differs from the first and fourth preferred embodiments in that a plurality of cells perform the operation as described in the first and fourth preferred embodiments.

In the sectors 2a, 37a and 41a of the cells 1, 35 and 36, the radio base-station devices 3a, 38a and 42a as masters receive the same GPS signal through the antennas 32, 40 and 44 from a GPS satellite not shown.

First, when the radio base-station device 3a, provided for the sector 2a of the cell 1 and serving as a master, receives the GPS signal through the antenna 32, then the GPS receiver 32 extracts the reference clock 9a as described in the fourth preferred embodiment. This reference clock 9a is inputted to the system clock generator 10. Then, as described in the first preferred embodiment, in the radio base-station devices 3b and 3c provided for the sectors 2b and 2c and serving as slaves, given offsets are added to the frame start signal 10b outputted from the system clock generator 10, and the frames 47a, 47b and 47c are configured such that, as shown with the cell 1 in FIG. 9, no overlap occurs on the OFDMA symbol numbers 14 among the preamble 16a and frame control information 49a for the sector 2a, the preamble 16b and frame control information 49b for the sector 2b, and the preamble 16c and frame control information 49c for the sector 2c.

Also, when the radio base-station device 38a, provided for the sector 37a of the cell 35 and serving as a master, receives the GPS signal through the antenna 40, then the radio base-station device 38a as the master and the radio base-station devices 38b and 38c as slaves operate in the same way as the radio base-station devices 3a, 3b and 3c. Then, as shown with the cell 35 in FIG. 9, the frames 47a, 47b and 47c are configured such that no overlap occurs on the OFDMA symbol numbers 14 among the preamble 47a and frame control information 50a for the sector 37a, the preamble 47b and frame control information 50b for the sector 37b, and the preamble 47c and frame control information 50c for the sector 37c.

Also, when the radio base-station device 42a, provided for the sector 41a of the cell 36 and serving as a master, receives the GPS signal through the antenna 44, then the radio base-station device 42a as the master and the radio base-station devices 42b and 42c as slaves operate in the same way as the radio base-station devices 3a, 3b and 3c. Then, as shown with the cell 36 in FIG. 9, the frames 47a, 47b and 47c are configured such that no overlap occurs on the OFDMA symbol numbers 14 among the preamble 48a and frame control information 51a for the sector 41a, the preamble 48b and frame control information 51b for the sector 41b, and the preamble 48c and frame control information 51c for the sector 41c.

Then, the frames 47a, 47b and 47c are controlled in timing such that synchronization is established among the sectors 2a, 37a and 41a of the cells 1, 35 and 36 corresponding to the frame 47a, among the sectors 2b, 37b and 41b of the cells 1, 35 and 36 corresponding to the frame 47b, and among the sectors 2c, 37c and 41c of the cells 1, and 36 corresponding to the frame 47c, and thus radio signals are transmitted and received to and from terminal stations respectively located in the sectors 2a, 2b, 2c, 37a, 37b, 37c, 41a, 41b and 41c.

With the frames 47a, 47b and 47c configured in this way, when radio signals are transmitted/received between terminal stations and the radio base-station devices 3a, 3b, 3c, 38a, 38b, 38c, 42a, 42b and 42c, no interference occurs among the preambles 16a, 16b, 16c, 47a, 47b, 47c, 48a, 48b and 48c and the frame control information 49a, 49b, 49c, 50a, 50b, 50c, 51a, 51b and 51c, and the frame transmission efficiency is improved not only between sectors but also between cells.

Sixth Preferred Embodiment

Figure 10:
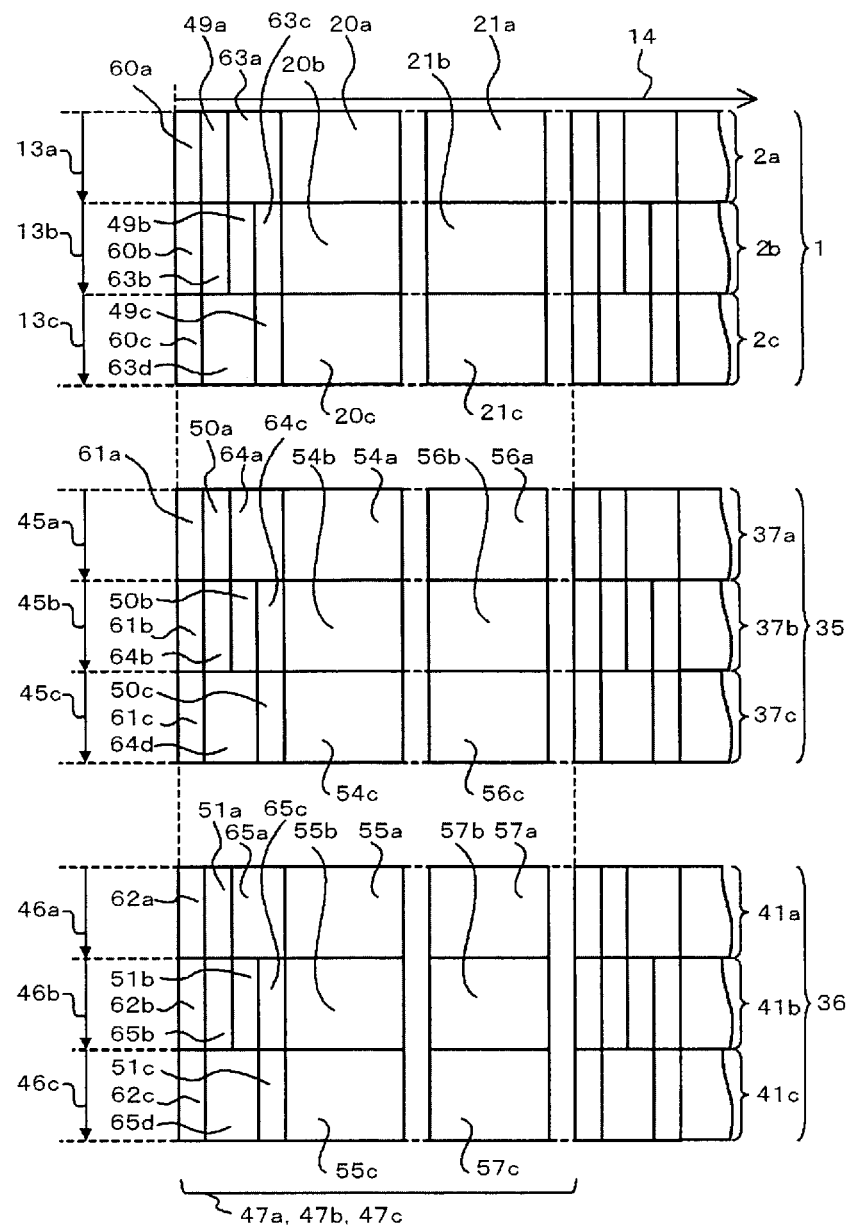
[FIG. 10] A diagram illustrating the frame structure according to a sixth preferred embodiment of the present invention.

In the fifth preferred embodiment, no overlap occurs on the OFDMA symbol numbers 14 among the preambles 16a, 16b and 16c and frame control information 49a, 49b and 49c of the frames 47a, 47b and 47c corresponding to the sectors 2a, 2b and 2c of the cell 1, the preambles 47a, 47b and 47c and frame control information 50a, 50b and 50c of the frames 47a, 47b and 47c corresponding to the sectors 37a, 37b and 37c of the cell 35, and the preambles 48a, 48b and 48c and frame control information 51a, 51b and 51c of the frames 47a, 47b and 47c corresponding to the sectors 41a, 41b and 41c of the cell 36; however, as shown with the OFDMA frame structure illustrated in FIG. 10, the preambles of the frames 47a, 47b and 47c may be made of different patterns of preambles 60a, 60b, 60c, 61a, 61b, 61c, 62a, 62b and 62c that have no correlation with each other, i.e. that can be detected even when interference occurs between preambles, and they may overlap each other on the OFDMA symbol numbers 14. The reference characters 63a, 63b, 63c, 63d, 64a, 64b, 64c, 64d, 65a, 65b, 65c and 65d indicate NULL subcarrier regions. In FIG. 10, the same reference characters as those used in the fifth preferred embodiment indicate the same or corresponding components and so they are not described again here.

In this way, the preambles 60a, 60b, 60c, 61a, 61b, 61c, 62a, 62b and 62c of different patterns having no correlation with each other overlap each other on the OFDMA symbol numbers 14, and thus the overhead is reduced for the time of the overlap of preambles 60a, 60b, 60c, 61a, 61b, 61c, 62a, 62b and 62c, and the frame transmission efficiency is further improved than in the fifth preferred embodiment.

Seventh Preferred Embodiment

Figure 11:
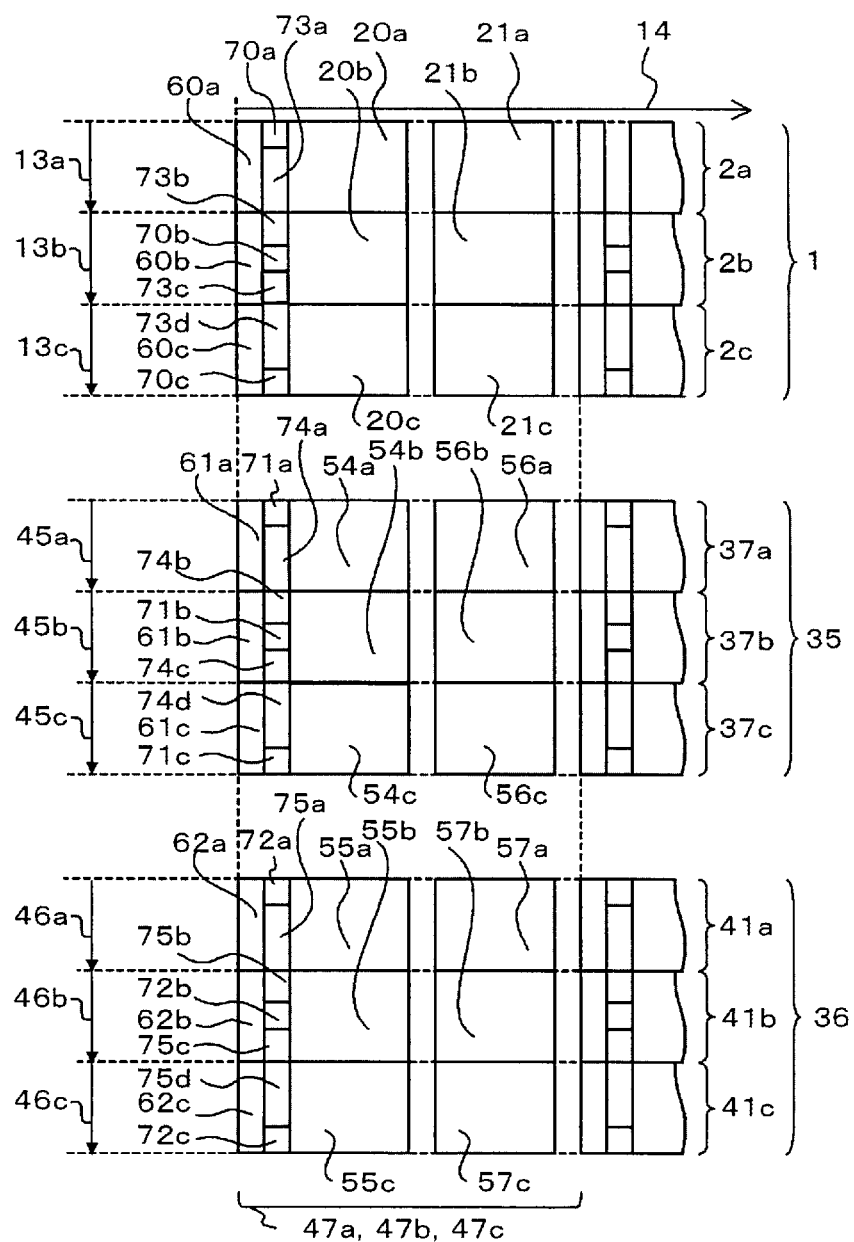
[FIG. 11] A diagram illustrating the frame structure according to a seventh preferred embodiment of the present invention.

In the sixth preferred embodiment, there are overlaps on the OFDMA symbol numbers 14 among the preambles 60a, 60b and 60c of the frames 47a, 47b and 47c corresponding to the sectors 2a, 2b and 2c of the cell 1, the preambles 61a, 61b and 61c of the frames 47a, 47b and 47c corresponding to the sectors 37a, 37b and 37c of the cell 35, and the preambles 62a, 62b and 62c of the frames 47a, 47b and 47c corresponding to the sectors 41a, 41b and 41c of the cell 36; however, as shown with the OFDMA frame structure illustrated in FIG. 11, in addition to arranging the preambles 60a, 60b, 60c, 61a, 61b, 61c, 62a, 62b and 62c to overlap each other on the OFDMA symbol numbers 14, the frames may be configured such that the pieces of frame control information 70a, 70b and 70c of the frames 47a, 47b and 47c corresponding to the sectors 2a, 2b and 2c of the cell 1 do not overlap on the logical subchannel numbers 13a, 13b and 13c, such that the pieces of frame control information 71a, 71b and 71c of the frames 47a, 47b and 47c corresponding to the sectors 37a, 37b and 37c of the cell 35 do not overlap on the logical subchannel numbers 45a, 45b and 45c, and such that the pieces of frame control information 72a, 72b and 72c of the frames 47a, 47b and 47c corresponding to the sectors 41a, 41b and 41c of the cell 36 do not overlap on the logical subchannel numbers 46a, 46b and 46c. The reference characters 73a, 73b, 73c, 73d, 74a, 74b, 74c, 74d, 75a, 75b, 75c and 75d indicate NULL subcarrier regions. In FIG. 11, the same reference characters as those used in the fifth and sixth preferred embodiments indicate the same or corresponding components and so they are not described again here.

In this way, the pieces of frame control information 70a, 70b and 70c are arranged such that they do not overlap on the logical subchannel numbers 13a, 13b and 13c, the pieces of frame control information 71a, 71b and 71c are arranged such that they do not overlap on the logical subchannel numbers 45a, 45b and 45c, and the pieces of frame control information 72a, 72b and 72c are arranged such that they do not overlap on the logical subchannel numbers 46a, 46b and 46c, and then the pieces of frame control information 70a, 70b, 70c, 71a, 71b, 71c, 72a, 72b and 72c can overlap on the OFDMA symbol numbers 14, and then the overhead is reduced for the time of the overlap, and the frame transmission efficiency is further improved than in the sixth preferred embodiment.

The fifth to seventh preferred embodiments have shown a configuration using three cells, but this configuration is only illustrative and not restrictive, and not intended to particularly limit the number.

Eighth Preferred Embodiment

Figure 12:
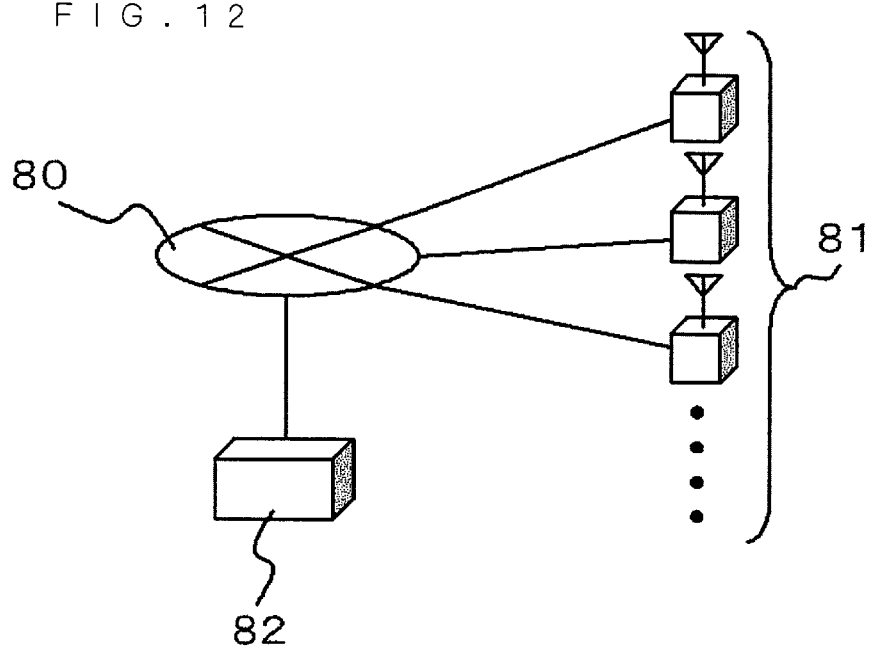
[FIG. 12] A diagram illustrating a network configuration according to an eighth preferred embodiment of the present invention.
Figure 13:
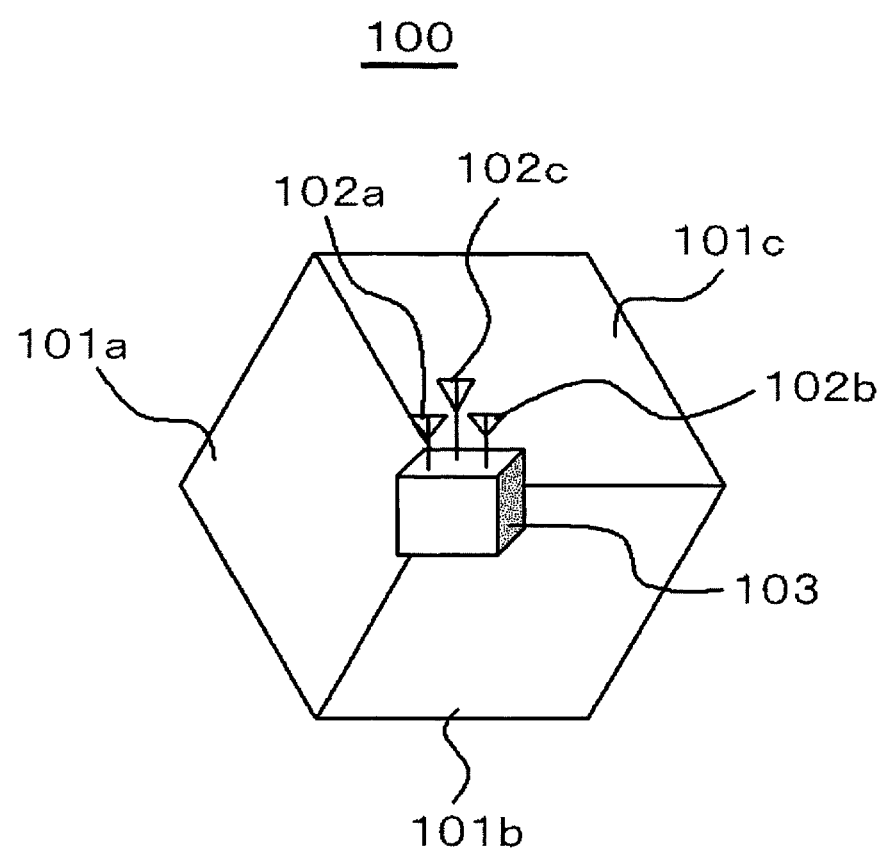
[FIG. 13] A diagram illustrating a conventional sector configuration.
Figure 14:
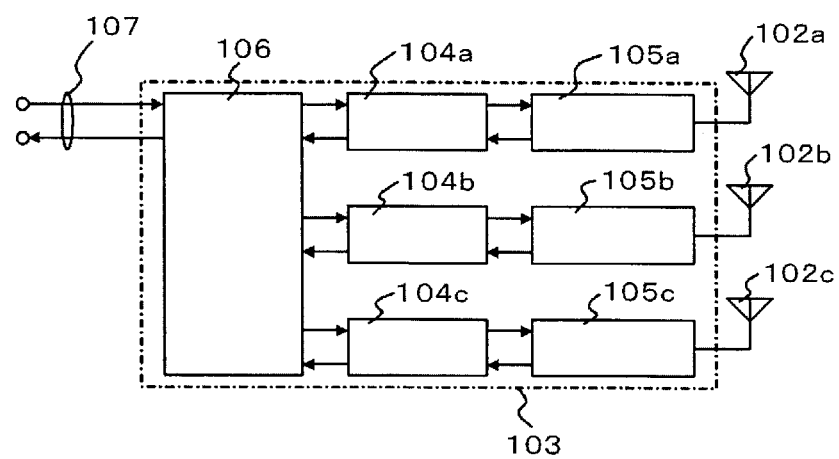
[FIG. 14] A diagram illustrating a conventional radio communications base-station apparatus.
Figure 15:
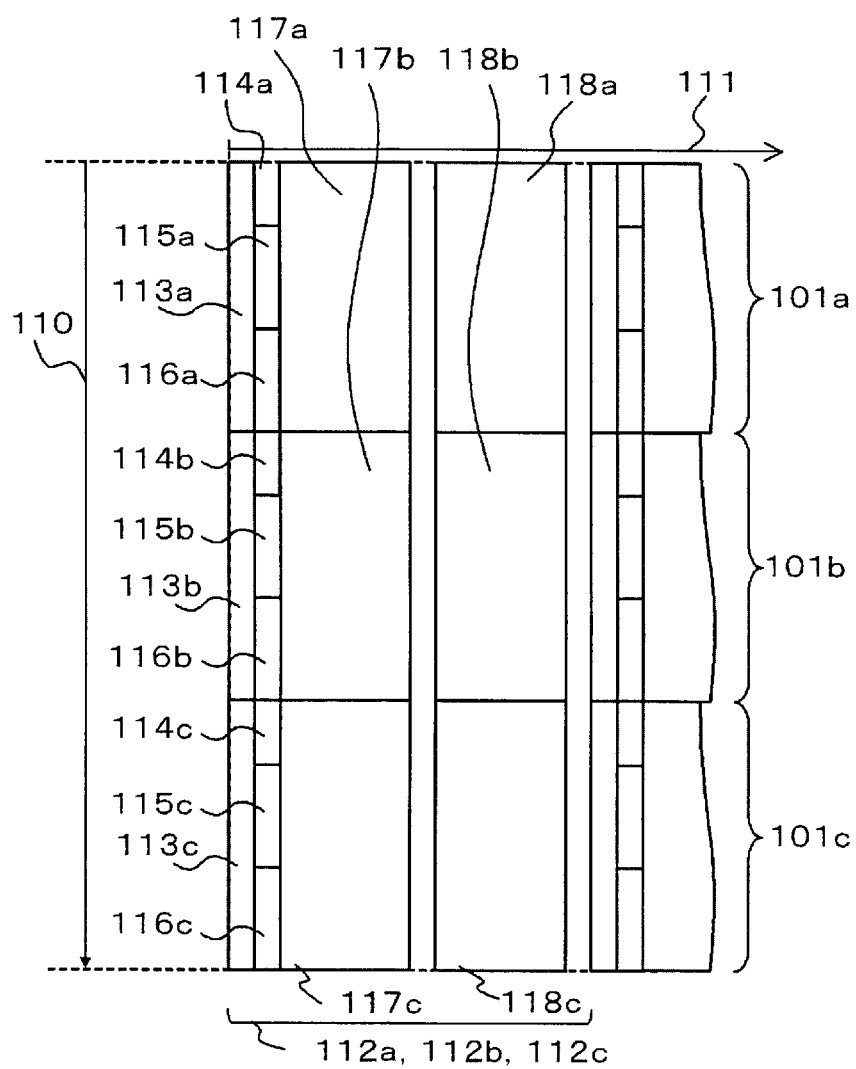
[FIG. 15] A diagram illustrating a conventional frame structure.

As shown in the network configuration diagram of FIG. 12, the radio base-station apparatuses shown in the first to seventh preferred embodiments are connected through a network 80 to a monitoring control apparatus 82 that performs management, setting, and changing of the structure of frames respectively formed in the plurality of radio base-station devices 81, and that also performs management, setting, and changing of the offsets added to the frames. This enables efficient centralized operation of the radio base-station apparatuses. The plurality of radio base-station devices 81 correspond to the radio base-station devices 3a, 3b, 3c, 38a, 38b, 38c, 42a, 42b and 42c described in the first to seventh preferred embodiments.

Industrial Applicability

The radio base-station apparatus of the present invention is applicable to radio base-station apparatuses that transmit and receive radio signals to and from terminal stations such as mobile phones.

What is claimed is:

1. A radio base-station apparatus for performing OFDMA multiple-access processing in a cell divided into a plurality of sectors, comprising:
a plurality of radio base-station devices, each radio base-station device associated with one of the sectors and including
a physical layer processing block that forms frames with logical subchannel numbers and OFDMA symbol numbers used for transmission and reception, and
a transmitter/receiver block that transmits the frames, wherein
each of the radio base-station devices operates on a same radio frequency with a frequency reuse factor of 1,
each of the frames includes a preamble and frame control information arranged sequentially at a beginning of the respective frame, and
when each of the radio base-station devices operates on the same radio frequency with the frequency reuse factor of 1, the radio base-station devices transmit the frames such that the preambles and frame control information of the frames do not interfere with each other between the frames and that beginnings of data regions of the frames on the OFDMA symbol numbers coincide with each other.

2. The radio base-station apparatus according to claim 1, further comprising
a reference clock source that generates a reference clock to synchronize the frames formed respectively by the radio base-station devices; and
a delay adder that adds an offset to the beginning of a given one of the frames synchronized on the basis of the reference clock, wherein
the offset is added to the beginning of the given one of the frames such that the preambles and frame control information arranged sequentially at the beginnings of the frames formed respectively by the radio base-station devices do not overlap on the OFDMA symbol numbers.

3. The radio base-station apparatus according to claim 2, wherein the reference clock source is a GPS receiver that receives a GPS signal from which the reference clock is extracted.

4. The radio base-station apparatus according to claim 1, further comprising a reference clock source that generates a reference clock to synchronize the frames formed respectively by the radio base-station devices, wherein
the preambles and frame control information sequentially arranged at the beginnings of the frames formed respectively by the radio base-station devices are arranged such that the preambles are transmitted together, are made of different preamble patterns having no correlation with each other, and overlap on the OFDMA symbol numbers, and the respective frame control information does not overlap on the OFDMA symbol numbers.

5. The radio base-station apparatus according to claim 4, wherein the reference clock source is a GPS receiver that receives a GPS signal from which the reference clock is extracted.

6. The radio base-station apparatus according to claim 1, further comprising
a reference clock source that generates a reference clock to synchronize the frames formed respectively by the radio base-station devices, wherein
the preambles and frame control information sequentially arranged at the beginnings of the frames formed respectively by the radio base-station devices are arranged such that the preambles are transmitted together, are made of different preamble patterns having no correlation with each other, and overlap on the OFDMA symbol numbers, and the respective frame control information does not overlap on the logical subchannel numbers and does overlap on the OFDMA symbol numbers.

7. The radio base-station apparatus according to claim 6, wherein the reference clock source is a GPS receiver that receives a GPS signal from which the reference clock is extracted.

8. A radio communications system, comprising:
the radio base-station apparatus according to claim 2 and further including a network interface that connects to a network; and
a monitoring control apparatus that connects to the network and performs management, setting, and changing of
the preambles and frame control information arranged in the frames formed respectively by the radio base-station devices of the radio base-station apparatus, and
the offset added to the frame.

9. A radio communications system, comprising:
a plurality of radio base-station apparatuses according to claim 3, each radio base-station apparatus associated with one of a plurality of cells, wherein
the GPS receivers of the radio base-station apparatuses respectively extract the respective reference clocks from the respective GPS signals, and
the radio base-station apparatuses are synchronized on the basis of the reference clocks.

10. A radio communications system, comprising:
a plurality of radio base-station apparatuses according to claim 5, each radio base-station apparatus associated with one of a plurality of cells, wherein
the GPS receivers of the radio base-station apparatuses respectively extract the respective reference clocks from the respective GPS signals, and
the radio base-station apparatuses are synchronized on the basis of the reference clocks.

11. A radio communications system, comprising:
a plurality of radio base-station apparatuses according to claim 7, each radio base-station apparatus associated with one of a plurality of cells, wherein
the GPS receivers of the radio base-station apparatuses respectively extract the respective reference clocks from the respective GPS signals, and
the radio base-station apparatuses are synchronized on the basis of the reference clocks.

12. The radio communications system according to claim 9, wherein
the radio base-station apparatuses each include a network interface that connects to a network; and
a monitoring control apparatus that connects to the network and performs management, setting, and changing of
the preambles and the frame control information arranged in the frames formed respectively by the radio base-station devices of the radio base-station apparatuses, and
the offsets added to the frames.

\* \* \* \* \*